United States Patent

[11] 3,609,717

[72] Inventors Sadamu Ohteru; Hiroshi Kobayashi; Yushi Uchida, all of Tokyo, Japan
[21] Appl. No. 824,704
[22] Filed Aug. 28, 1969
[45] Patented Sept. 28, 1971
[73] Assignee Nippon Electric Company, Limited Minato-ku, Tokyo, Japan

[54] MAGNETIC MEMORY DEVICE
4 Claims, 4 Drawing Figs.

[52] U.S. Cl. .......... 340/174 CT, 340/174 TB
[51] Int. Cl. .......... G11c 11/08, G11c 7/00
[50] Field of Search .......... 340/174; 307/88, 106

[56] References Cited

UNITED STATES PATENTS

| | | | |
|---|---|---|---|
| 2,959,686 | 11/1960 | Guterman .......... | 307/88 |
| 3,127,519 | 3/1964 | Schuringa et al. .......... | 307/88 |
| 3,200,382 | 8/1965 | Busch .......... | 340/174 |
| 3,201,593 | 8/1965 | Anderson et al. .......... | 307/88 |

*Primary Examiner*—Stanley M. Urynowicz, Jr.
*Attorney*—Marn & Jangarathis

ABSTRACT: Apparatus for converting a unipolar pulse to a bipolar pulse is disclosed in accordance with the teachings of the present invention wherein a saturable magnetic core exhibiting a substantially rectangular hysteresis characteristic and admitting of first and second states of saturation is provided with an input winding, an output winding and reset winding means wound thereabout. A unipolar pulse applied to the input winding drives the magnetic core into its first state of saturation, thereby inducing a pulse of like polarity to the unipolar pulse in the output winding. When the unipolar pulse terminates, a reset current is applied to the reset winding means to drive the magnetic core into its second state of saturation, thereby inducing a pulse of opposite polarity to the unipolar pulse in the output winding. The bipolar pulses thus induced in the output winding may be utilized as write-in pulses for a transfluxor.

INVENTORS
Sadamu Ohteru
Hiroshi Kobayashi
Yushi Uchida
BY
Marn & Jangarathis
ATTORNEYS INVENTORS
Sadamu Ohteru
Hiroshi Kobayashi
Yushi Uchida
BY
Marn & Jangarathis
ATTORNEYS

MAGNETIC MEMORY DEVICE

This invention relates to a magnetic device and, more particularly, to a novel circuit arrangement utilized in the magnetic memory device with conventional transfluxors.

A conventional transfluxor is composed of a multiaperture magnetic core with rectangular hysteresis characteristic in which a plurality of closed magnetic circuits sharing a common magnetic circuit are formed of a plurality of yokes constituting a part of the core and a plurality of windings provided on the yokes.

The closed magnetic circuits are composed of two parts. One is a write-in magnetic circuit and the other is a readout magnetic circuit constituting a part of the write-in magnetic circuit. A write-in winding is provided on the yoke constituting the write-in magnetic circuit, and is connected to an output of a write-in voltage pulse generator. On the other hand, two readout windings with the same number of turns are provided on the outer and inner yokes constituting a part of the readout magnetic circuit, so as to produce ampere-turns of opposite polarities to each other. Readout pulses are applied from a readout pulse generator alternately to these readout windings through diodes. A load terminates these windings in common. As circuit arrangement, a separate output winding may be provided for the output magnetic circuit with a load terminating this output winding.

Now operation of the conventional transfluxor with the load connected to the readout windings will be outlined. At first, the write-in magnetic circuit is forced to saturate magnetically in either direction. This state is called "blocking" state. Under this condition, the load current becomes maximum. Secondly, only the first pulse in a train of write-in pulse is applied to the write-in winding (this action is called "setting" state) to magnetize a part of the write-in magnetic circuit in a direction opposite to that in the blocking state.

Then, each of the readout windings becomes more inductive than what it has been. Thus, the decrease in the load current follows. With the progress of setting by applying the write-in pulses in succession to the write-in winding, it reaches the state at which the magnetic flux in the write-in magnetic circuit is reduced to one-half of that in the blocking state. At this moment, the polarity of the write-in pulses is reversed. If the write-in operation is further continued (this action is called "resetting" the magnetization approaches that of the blocked state and a load current reaches maximum again. The characteristics of such variations of the load current with number of write-in pulses applied to the write-in winding will be called "the control characteristics" of the transfluxor. These magnetic memory devices comprising the transfluxors have the inherent drawbacks as follows:

Increase in the number of memory stages of a particular transfluxor with constant storage capacity results in marked deterioration in the control characteristics of either setting or resetting. More specifically, there will occur a control range in which variation of the load current remains extremely small or substantially negligible , even if a setting or resetting pulse is written in. This will result in extraordinary nonlinearity or undesirable hysteresis phenomenon of the control characteristics. For these reasons, those memory devices are very difficult to be put into practical use.

Several proposals for eliminating these defects have been made.

According to one method, a separate winding is provided for the write-in magnetic circuit to apply a DC bias on the winding. This method is effective in making setting and resetting control characteristics highly symmetrical. Another method which is appreciably effective for improvements in the control characteristics consists in utilizing part of the load current for producing a biaslike magnetic field in the write-in magnetic circuit. This method is effective in compensating for nonuniformity of the reversible magnetic permeability of the core and to provide satisfactory linearity for the control characteristics.

Still another method that has been currently adopted for outstanding improvements in the control characteristics is the utilization of a bipolar-pulse write-in system in place of the conventional single-pulse write-in system. The term "bipolar-pulse write-in system" means performing setting with a pulse of positive polarity and then, resetting with a pulse of negative polarity immediately following the positive polarity pulse so as to take the difference in magnetic flux variation produced between the two pulses as a write-in quantity. With a transfluxor, setting and resetting flux patterns are considerably deviated from each other depending on how write-in or readout was performed and this deviation is responsible for making the control characteristics asymmetrical and nonlinear. The bipolar-pulse write-in system is eminently superior to the conventional single-pulse write-in system in that flux variations at each flux level (memory level) of a magnetic core become much more uniform and the control characteristics become highly linear and symmetrical, because every write-in operation involves invariably setting and resetting.

Accordingly a principal object of this invention is to provide a magnetic device utilizing transfluxors with improved control characteristics which incorporate a single-pulse/bipolar-pulse converter featured by simple construction and stabilized operation.

According to this invention, the single-pulse/bipolar-pulse converter which is an integral part of the memory device has the following features:

1. Extremely simple construction. Consists essentially of one magnetic core with rectangular hysteresis characteristic and one switching transistor.

2. stabilized operation. No apprehension for erroneous operation caused by external because the coercive force of the magnetic core is sufficiently large.

3. Provision of a holding action such that the negative pulse of the bipolar pulse can never occur while the positive pulse is being produced.

4. Self-triggering action such that the negative pulse is automatically applied on termination of the positive pulse.

Now the principles of this invention will become apparent from the following more specific description taken in connection with the accompanying drawings, in which.

Figure 1:
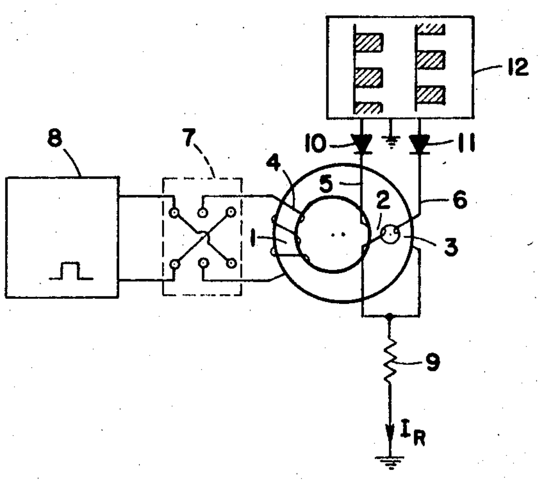
FIG. 1 is a schematic diagram illustrating the basic circuit arrangement of a conventional analogue magnetic memory device comprising the transfluxor with nondestructive readout capabilities.

In FIG. 1, there are shown $N_1$-turn write-in winding 4 wound on yoke 1 and $N_2$-turn readout windings 5 and 6 respectively wound on yokes 2 and 3. A write-in pulse generator 8 is connected to the write-in winding 4 through a polarity-reversal switch 7, whereas a readout pulse generator 12 is connected to both of readout windings 5 and 6 through diodes 10 and 11 and these windings are terminated with a load 9. The readout pulse generator 12 is, for instance, a multivibrator, being provided with two pairs of output terminals through which passes of the same amplitude and duration are sent to the readout windings alternately, one after another.

With this circuit arrangement, after the write-in magnetic circuit is blocked in one direction, polarity of switch 7 is reversed. Then, write-in pulses of suitable amplitude and duration are applied too the write-in winding, one by one, to set the transfluxor step by step in a direction opposite to that in the blocking. Then, the mean value $I_R$ of the load current flowing through the load 9 decreases in the manner as shown by the control characteristic curve (solid-line curve) 31 or 32 in FIG. 4. After the load current $I_R$ has arrived at point 30, of the write-in is continued with the polarity of write-in pulses reversed, the load current increases in a manner as illustrated by the solid-line curve 31 or 32. The difference between the solid-line curves 31 and 32 depends upon the direction in which the transfluxor has been initially blocked.

The basic circuit arrangement shown in FIG. 1 is not suited for practical use in that there is a marked difference in the control characteristics between setting and resetting and linearity is degraded accordingly. These phenomena are mainly attributable to the deleterious effect of readout ampere-turns on the write-in side and the uniform reversible permeability distribution of the magnetic core.

Figure 2:
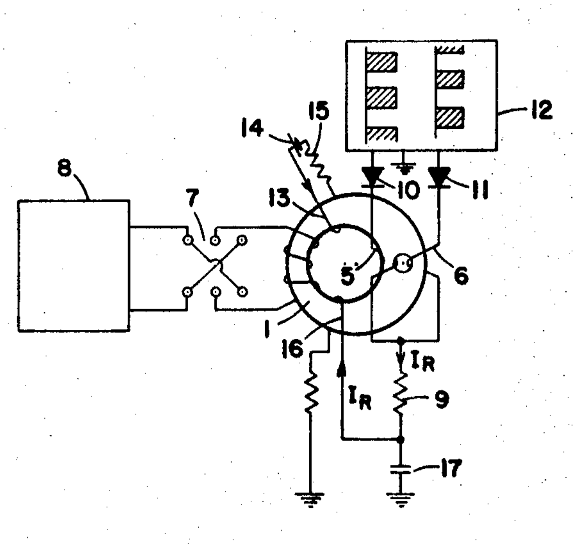
FIG. 2 is a modification of the circuit arrangement of FIG. 1.

Referring to FIG. 2 which shows a slight modification of the circuit arrangement of FIG. 1, it will be seen that a DC bias winding 13 is separately provided and direct current is conducted from a DC power source 14 through resistance 15 so as to cancel out the effect of ampere-turns of readout windings 5 and 6 on the write-in magnetic circuit passing through yoke 1 and to improve thereby the symmetry of the setting and resetting control characteristics. The load current $I_R$which has been smoothed out by the capacitor 17 flows in the feedback winding 16. This has an effect equivalent to tilting the ordinate towards the abscissa for the magnetization curve of a magnetic core at a suitable angle. For this reason, the reversible permeability distribution of the core becomes uniform and the control characteristics become highly linear. In other words, both symmetrical properties and linearity of the control characteristics can be appreciably improved as shown by the broken curve 33 in FIG. 4 when these compensating means are adopted.

Figure 4:
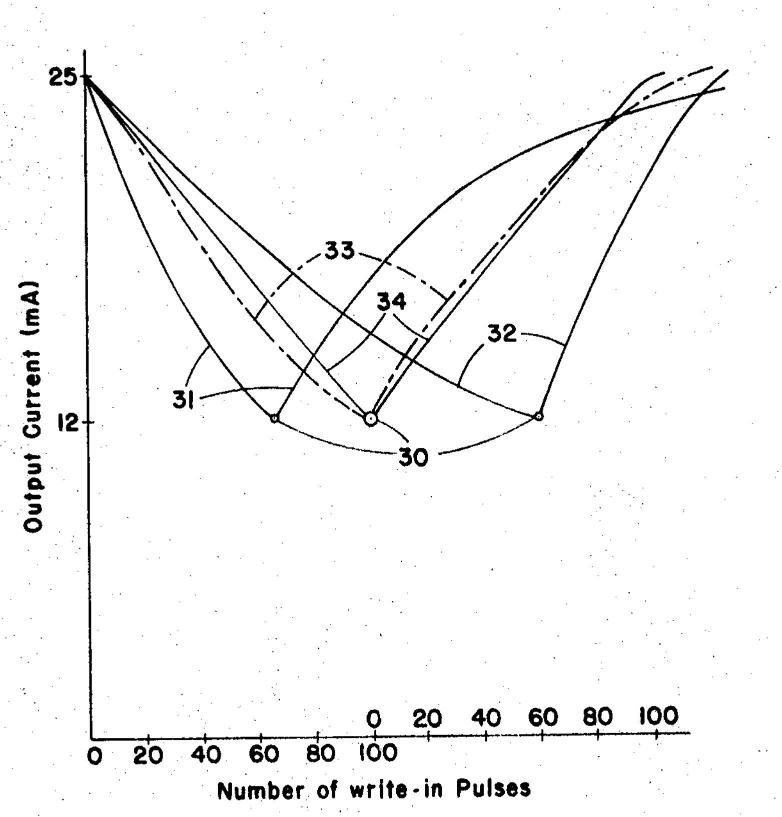

The control characteristics available by the single-pulse write-in system of FIG. 1 or 2 are still insufficient, being of the degree as shown by the curve 33 in FIG. 4.

Figure 3:
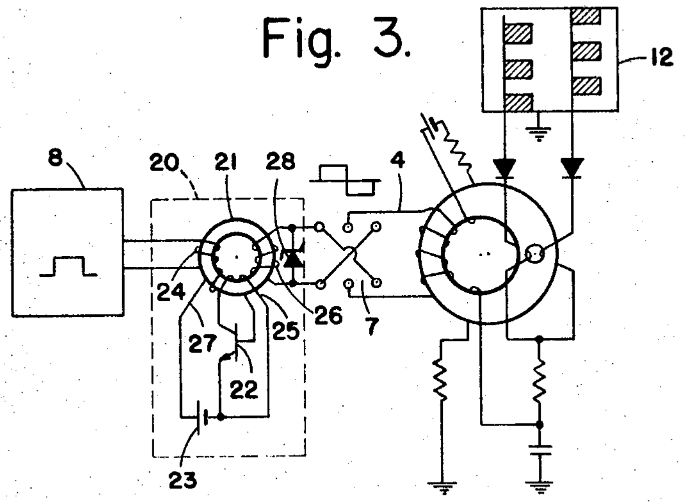
FIG. 3 is a schematic diagram illustrating a circuit arrangement of a magnetic memory device according to this invention and FIG. 4 shows control characteristic curves for demonstrating the outstanding technical advantages of the present magnetic memory device as compared with those of the conventional.

FIG. 3 illustrates a circuit arrangement having a bipolar pulse generator according to this invention intended for much more improvements in the control characteristics than the one 33 shown in FIG. 4. This circuit arrangement is featured by interposing a bipolar pulse generator 20 between a pulse generator 8 and a phase reversal switch 7.

The bipolar pulse generator 20 consists of a magnetic core 21 with rectangular hysteresis characteristic, a transistor 22, ad a DC power source 23. Operating principles of the bipolar pulse generator will be described.

A feedback winding 25 is coupled to the transistor 22 and is designed to produce therein an induced voltage which will make the base negative with respect to the emitter upon entering of a write-in pulse into the input winding 24 from the write-in pulse generator 8. Under this condition, the transistor 22 is kept in the cutoff state. Thus, an output pulse is induced in the output winding 26 by the transformer action, and applied to the write-in winding 4 of the transfluxor. During this time interval, the flux level of the magnetic core 21 rises by an amount corresponding to the time integral of the input pulse. On termination of the input pulse, the magnetic flux level of the magnetic core 21 begins to decrease. Accordingly, a voltage is induced by this flux change in the feedback winding 25 of the transistor 22 so as to make the base positive with respect to the emitter and the transistor 22 conductive.

Upon application of the voltage of the DC power source 23 to the main winding 27, the transistor 22 is completely turned 'ON' by the voltage induced in the feedback winding 25 from the main winding 27. Under this condition, the voltage of the DC power source 23 is applied directly to the main winding 27 and the flux level of the magnetic core reaches the lower saturation state of its rectangular hysteresis characteristic.

Under this condition, the magnetic core 21 ceases its transformer action, and the transistor 22 assumes its cutoff state. Therefore, during this flux level dropping period, a pulse opposite in polarity to the initial input pulse is produced in the output winding 26 and this pulse is applied to the write-in winding 4 of the transfluxor. It will be seen that, the amplitude and width of the pulse with opposite polarity can be easily controlled, because the pulse amplitude is determined by the Zener voltage of the diode 28 and the pulse width is proportional to the voltage of the DC power source 23.

Pulses delivered from the pulse generator 8 are converted into bipolar pulses before being applied to the write-in winding in accordance with the operating principles of the bipolar pulse generator as mentioned previously. According to the bipolar pulse write-in system, the transfluxor is set by the initial positive pulse and reset by the negative pulse immediately following the positive pulse, with a consequence that the difference in magnetic flux variations produced by these two pulses becomes a write-in quantity of the transfluxor. Substantial cancellation of the difference between the setting and the resetting control characteristics as experienced in an ordinary single-pulse write-in system contributes greatly to improvements in the control characteristics. Furthermore, since both the amplitude and width ratios between the positive and negative pulses can be controlled easily, the desirous control characteristics are obtained.

Thus, a V-shaped control characteristic curve as shown at 34 in FIG. 4 which is almost ideal for an analogue memory can be obtained with the circuit arrangement shown in FIG. 3, in which a bipolar pulse generator 20 detailed previously is provided and the two compensating means shown in FIG. 2 are incorporated.

What is claimed is:

1. In combination with a magnetic memory device having a transfluxor as a memory element thereof, a write-in pulse generator for applying write-pulse to said transfluxor, comprising:
   - a saturable magnetic core exhibiting a substantially rectangular hysteresis characteristic and having first and second state of saturation;
   - an input winding wound on said magnetic core for receiving a unipolar pulse said input winding being energized in response to said received unipolar pulse to drive said magnetic core to said first state of saturation;
   - a source of unipolar connected to said input winding;
   - a feedback winding wound on said magnetic core;
   - a main winding wound on said magnetic core;
   - a switching transistor coupled to said feedback winding and said main winding such that the base and emitter electrodes of said switching transistor are connected in series relationship with said feedback winding and the collector and emitter electrodes of said switching transistor are connected in series relationship with said main winding; said switching transistor having a conducting state and a nonconducting state such that the voltage induced in said feedback winding when said magnetic core is driven to said first state of saturation is effective to maintain said switching transistor in the nonconducting state and the voltage induced in said feedback winding when said unipolar pulse supplied to said input winding terminates is effective to bias said switching transistor into the conducting state;
   - a source of current connected in series relationship with said main winding and said collector and emitter electrodes for supplying current to said main winding when said switching transistor is in its conducting state to drive said magnetic core to said second state of saturation; and
   - an output winding wound on said magnetic core and coupled to said transfluxor such that a pulse of like polarity to said unipolar pulse is induced in said output winding and applied to said transfluxor when said magnetic core is driven to said first state of saturation and a pulse of opposite polarity to said unipolar pulse is induced in said output winding and applied to said transfluxor when said magnetic core is driven to said second state of saturation.

2. Apparatus for converting a unipolar pulse admitting of a first polarity to a bipolar admitting of a first and second polarity, comprising:
   - a saturable magnetic core exhibiting a substantially rectangular hysteresis characteristic and having first and second states of saturation;
   - an input winding wound on said magnetic core for receiving a unipolar pulse, said input winding being energized in response to said received unipolar pulse to drive said magnetic core to said first state of saturation;

reset winding means wound on said magnetic core for driving said magnetic core from said first state of saturation to said second state of saturation;

rest circuit means coupled to said reset winding means for supplying current to said reset winding means;

an output winding wound on said magnetic core and magnetically coupled to said input winding and said reset winding means for producing a pulse of like polarity to said unipolar pulse in said output winding when said magnetic core is driven to said first state of saturation and a pulse of opposite polarity to said unipolar pulse in said output winding when said magnetic core is driven to said second state of saturation; and a voltage control means connected in parallel relationship with said output winding for controlling the amplitude of the bipolar pulse produced by said output winding.

3. The apparatus of claim 2 wherein said reset winding means comprises:

a feedback winding wound on said magnetic core for inducing a biasing voltage therein when said unipolar pulse terminates; and a main winding wound on said magnetic core for receiving a reset current when said biasing voltage is induced in said feedback winding.

4. The apparatus of claim 3 wherein said reset circuit mean comprises a serial combination of switch means and a source of reset current, said serial combination being connected in series relationship with said main winding; and switch control means connected in series relationship with said feedback winding, said switch control means being responsive to said biasing voltage for closing said switch means whereby reset current flows through said main winding to drive said magnetic core to said second state of saturation.

UNITED STATES PATENT OFFICE
CERTIFICATE OF CORRECTION

Patent No. 3,609,717 Dated September 28, 1971

Inventor(s) Sadamu Ohteru, Hiroshi Kobayashi and Yushi Uchida

It is certified that error appears in the above-identified patent and that said Letters Patent are hereby corrected as shown below:

Column 4, line 26, "write-pulse" should be --write-in pulses--;

line 30, "state" should be --states--;

line 32, after "pulse" should be inserted --,--;

line 35, after "unipolar" should be inserted --pulses--;

line 67, after "bipolar" should be inserted --pulse--.

Column 5, line 4, "rest" should be --reset--.

Column 6, line 7, "mean" should be --means--.

Signed and sealed this 21st day of March 1972.

(SEAL)
Attest:

EDWARD M.FLETCHER,JR.
Attesting Officer

ROBERT GOTTSCHALK
Commissioner of Patents